Aug. 24, 1965 G. W. BONES ETAL 3,202,932

VARIABLE FREQUENCY MULTI-PHASE SIGNAL GENERATOR WITH PHASE DIFFERENCE CONSTANT OVER FREQUENCY BAND

Filed April 29, 1963

INVENTOR.
G. W. BONES
W. R. RAISANEN

BY Wade Koontz
ATTORNEY
James S. Shannon and
AGENT

United States Patent Office 3,202,932
Patented Aug. 24, 1965

3,202,932

VARIABLE FREQUENCY MULTI-PHASE SIGNAL GENERATOR WITH PHASE DIFFERENCE CONSTANT OVER FREQUENCY BAND

Glenn W. Bones, Bloomington, and Walfred R. Raisanen, St. Paul, Minn., assignors, by mesne assignments, to the United States of America as represented by the Secretary of the Air Force Filed Apr. 29, 1963, Ser. No. 276,676
2 Claims. (Cl. 331—45)

The purpose of this invention is to provide a multiphase clock source for digital computer systems whose frequency may be varied without varying the phase relationships or the amplitude of the output voltage.

The clock comprises a variable frequency oscillator, a wideband RC phase shifting network for deriving from the oscillator output two equal amplitude signals of the oscillator frequency that maintain a constant amplitude and a constant phase separation of 90° over the desired range of variation of the oscillator frequency. These two signals are then combined into three clock phases of constant amplitude and phase relationship by means of a transformer network.

The invention will be explained more fully with reference to the specific embodiment thereof shown in the accompanying drawings in which.

Figures 1, 2:
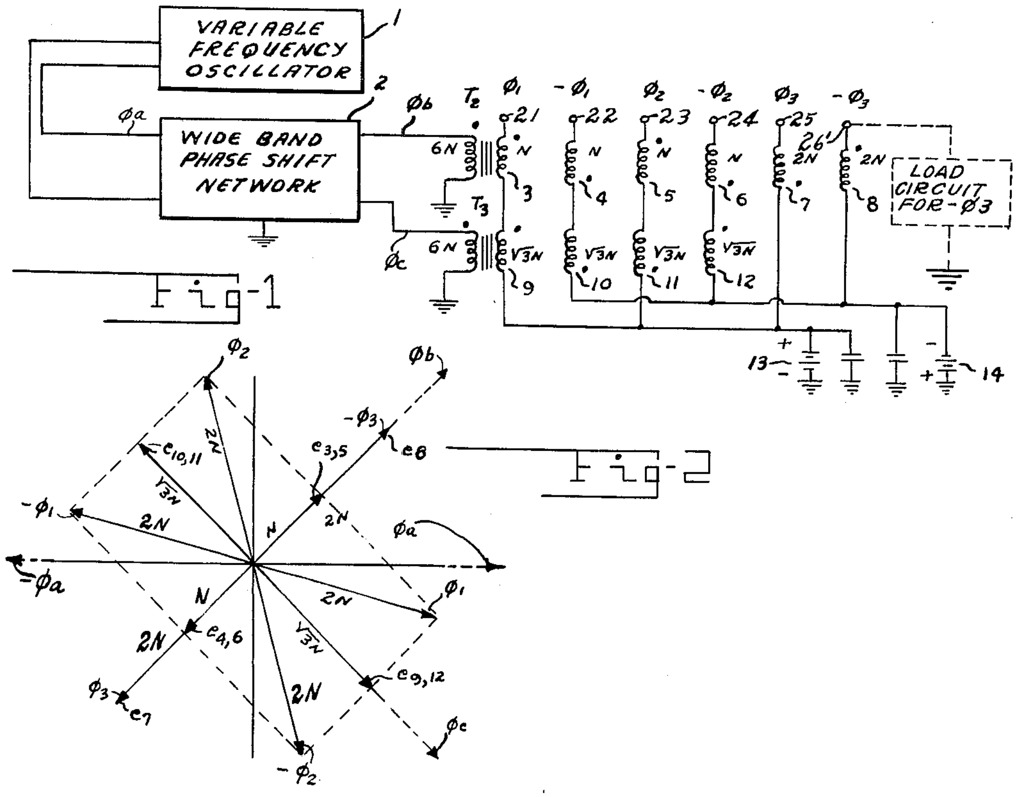
FIG. 1 shows the complete clock circuit.
FIG. 2 is a vector diagram showing the phase relationships in FIG. 1.

Referring to FIG. 1, the variable frequency oscillator 1 is the timing element of the variable frequency clock. The output signal of the oscillator, having a phase designated $\phi_a$, is applied to wideband phase shift network 2. This network produces two output signals of oscillator frequency one having a phase designated $\phi_b$ and the other having a phase designated $\phi_c$. The properties of the network are such that these signals have a constant amplitude and their phase difference is a constant 90° over the designated frequency band. This phase difference is attained in the network by shifting the $\phi_b$ 45° ahead of $\phi_a$ and by retarding $\phi_c$ 45° with respect to $\phi_a$. These phase relationships are illustrated in FIG. 2.

The two phases $\phi_b$ and $\phi_c$ are converted into three clock phases $\phi_1$, $\phi_2$ and $\phi_3$ and their phase opposites by the transformer network $T_2$–$T_3$. Transformer $T_2$ has six secondary windings 3–8 having phases relative to the primary phase as indicated by the dots. The primary to secondary turns ratio is 6 for secondary windings 3–6 and 3 for secondary windings 7 and 8. Transformer $T_3$ has four secondary windings 9–12, and the primary to secondary turns ratio for each is $6/\sqrt{3}$. The phase relationships between these windings and the $T_3$ primary are like wise indicated in FIG. 1 by dots. The manner in which the transformer network combines signals of the magnitudes N and $\sqrt{3}N$ (for primary signals of magnitude 6N) to produce the three phases $\phi_1$, $\phi_2$ and $\phi_3$ separated by 120° is shown in the vector diagram of FIG. 2. The phase opposites $-\phi_1$, $-\phi_2$ and $-\phi_3$ are derived by simply reversing the polarities of the secondaries 4–10, 6–12 and 8, respectively, relative to the secondaries producing the phases $\phi_1$, $\phi_2$ and $\phi_3$. Direct current sources 13 and 14 may be used to supply equal and oppositely poled biases to the positive phase and negative phase circuits, respectively, if required. Capacitors 19 and 20 are for by-passing the signal around sources 13 and 14, i.e. as far as the signal is concerned they effectively connect the lower ends of widings 9, 10, 11, 12, 7 and 8 to ground. The output voltages of phases $\phi_1$, $-\phi_1$, $\phi_2$, $-\phi_2$, $\phi_3$ and $-\phi_3$ appear between output terminals 21, 22, 23, 24, 25 and 26, respectively, and ground and the various load or utilization circuits are connected between these output terminals and ground. For example, the load circuit for the $-\phi_3$ voltage is connected between terminal 26 and ground, as shown dotted in FIG. 1.

Figure 3:
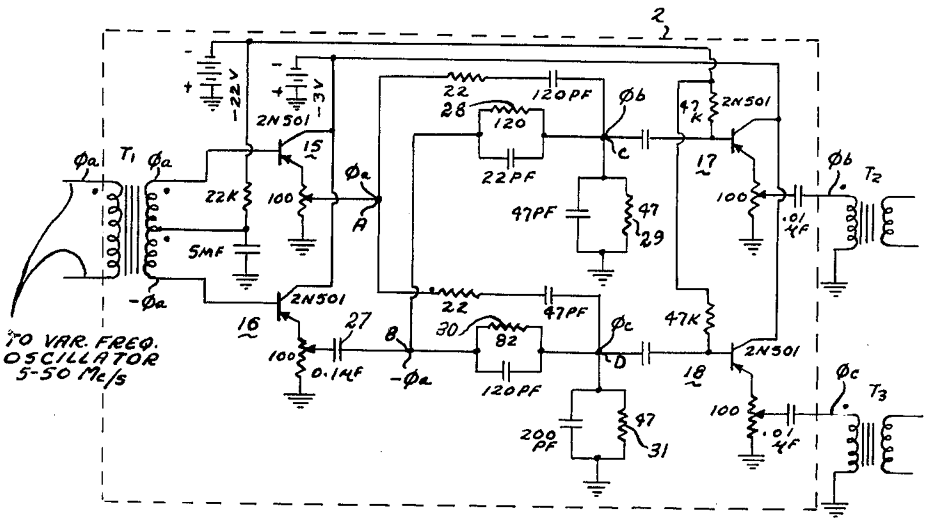
FIG. 3 shows the specific design of the phase shift network of FIG. 1 for a frequency range of 5 to 50 megacycles/second.

FIG. 3 shows the details of an RC network meeting the requirements of network 2. This network is designed for the frequency range 5–50 mc./s. and operates over this range to derive from a signal of phase $\phi_a$ two equal amplitude signals of phases $\phi_b$ and $\phi_c$ 90° apart and each separated from $\phi_a$ by 45° in opposite directions, as shown in FIG. 2. Networks of this type are known in the art and described in the literature, for example, in a paper by D. K. Weaver, Jr. entitled Design of RC Wide-Band 90-Degree Phase-Difference Network, appearing in the April 1954 issue of the Proceedings of the I.R.E., pages 671–676.

Referring to FIG. 3, the input terminals of the RC network are labeled A and B and the output terminals C and D. The remainder of the circuit consists of input and output coupling devices. The network design requires that the input signal be in two oppositely phased components of equal amplitudes relative to the point of reference potential, in this case ground. Hence a signal of phase $\phi_a$ is applied to terminal A and an equal signal of phase $-\phi_a$ is applied to terminal B. This results in a signal at terminal C of phase $\phi_b$ which leads $\phi_a$ by 45° and a signal at terminal D of phase $\phi_c$ which lags $\phi_a$ by 45°, so that the phase difference between $\phi_b$ and $\phi_c$ is 90°. This is illustrated in the vector diagram of FIG. 2. The equal signals of opposite phases $\phi_a$ and $-\phi_a$ are derived from the $\phi_a$ output of oscillator 1 by means of a center tapped transformer $T_1$ and are applied to the input terminals A and B by emitter followers 15 and 16, as shown. The output signals at terminals C and D are coupled to the transformers $T_2$ and $T_3$ by emitter follower 17 and 18. Capactor 27 is merely a blocking capacitor used to avoid the direct current shunting effect by resistors 28, 29, 30 and 31 on the emitter resistor of transistor 16, and does not operate as an element of the RC phase shifting network.

We claim:

1. A variable frequency multi-phase clock comprising: an oscillator variable in frequency over a predetermined range; a wideband phase shift network coupled to said oscillator and operating to derive from the oscillator output two signals having equal amplitudes and a constant 90° phase separation over said frequency range; a first transformer having a primary winding and three secondary windings two of which are of the same polarity as the primary winding and the third of which is of opposite polarity, the primary to secondary turns ratio being 6 for the two secondary windings of like polarity and 3 for the secondary winding of opposite polarity; a second transformer having a primary winding and two secondary windings one of like and the other of opposite polarity relative to the primary winding, the primary to secondary turns ratio being $6/\sqrt{3}$ for each secondary winding; couplings between said phase shift network and the primaries of said transformers for applying one of said 90° signals to the primary of said first transformer and the other of said 90° signals to the primary of said second transformer; three output terminals; means connecting a first transformer secondary of polarity like the primary and a second transformer secondary of polarity like the primary in series between one of said output terminals and a point of reference potential; means connecting the other first transformer secondary of polarity like the primary and the second transformer secondary of polarity opposite the primary in series between another of said output terminals and said point of reference potentials;

and means connecting said first transformer secondary of polarity opposite the primary between the remaining output terminal and said point of reference potential.

2. A variable frequency multi-phase clock comprising: an oscillator variable in frequency over a predetermined range; a wideband phase shift network coupled to said oscillator and operating to derive from the oscillator signal two signals of the same frequency having equal amplitudes and a constant 90° phase separation over said frequency range, one of said two signals leading said oscillator signal by 45° and the other lagging said oscillator signal by 45°; a first transformer having a primary winding and six secondary windings three of which have the same polarity as the primary winding and three of which have opposite polarity relative to the primary, the primary to secondary turns ratio being 3 for one winding of like polarity and one winding of opposite polarity and 6 for the remaining four secondary windings; a second transformer having a primary winding and four secondary windings two of which have the same polarity as the primary winding and two of which have opposite polarity relative to the primary, the primary to secondary turns ratio being $6/\sqrt{3}$ for each secondary winding; couplings between said phase shift network and the primaries of said transformers for applying said signal of leading phase to the primary of said first transformer and said signal of lagging phase to the primary of said second transformer; six output terminals; means connecting one first transformer secondary of polarity like the primary and turns ratio 6 and one second transformer secondary of polarity like the primary in series between one of said output terminals and a point of reference potential; means connecting the other first transformer secondary of polarity like the primary and turns ratio 6 and one second transformer secondary of polarity opposite the primary in series between another output terminal and said point of reference potential; means connecting one first transformer secondary of polarity opposite the primary and turns ratio 6 and the other second transformer secondary of polarity opposite the primary in series between another output terminal and said point of reference potential; means connecting the remaining first transformer secondary of polarity opposite the primary and turns ratio 6 and the remaining second transformer secondary in series between another output terminal and said point of reference potential; means connecting one of the two remaining first transformer secondaries between another output terminal and said point of reference potential; and means connecting the other remaining first transformer secondary between the remaining output terminal and said point of reference potential.

References Cited by the Examiner

UNITED STATES PATENTS

| | | | |
|---|---|---|---|
| 1,843,521 | 2/32 | Smith | 321—57 X |
| 2,333,502 | 11/43 | Wickham | 331—45 |

ROY LAKE, *Primary Examiner.*

JOHN KOMINSKI, *Examiner.*